United States Patent
Yoshimura (10) Patent No.: US 11,498,169 B2
(45) Date of Patent: Nov. 15, 2022

(54) CLAMPING APPARATUS

(71) Applicant: KOSMEK LTD., Hyogo (JP)

(72) Inventor: Gaku Yoshimura, Hyogo (JP)

(73) Assignee: KOSMEK LTD, Kobe (JP)

( * ) Notice: Subject to any disclaimer, the term of this patent is extended or adjusted under 35 U.S.C. 154(b) by 867 days.

(21) Appl. No.: 15/508,595

(22) PCT Filed: Nov. 25, 2015

(86) PCT No.: PCT/JP2015/083009
§ 371 (c)(1),
(2) Date: Mar. 3, 2017

(87) PCT Pub. No.: WO2016/088616
PCT Pub. Date: Jun. 9, 2016

(65) Prior Publication Data
US 2017/0252881 A1    Sep. 7, 2017

(30) Foreign Application Priority Data

Dec. 5, 2014 (JP) .............................. JP2014-246833

(51) Int. Cl.
*B23Q 3/06* (2006.01)
*B25B 5/06* (2006.01)
*B23Q 3/08* (2006.01)

(52) U.S. Cl.
CPC ............... *B23Q 3/06* (2013.01); *B23Q 3/082* (2013.01); *B25B 5/061* (2013.01)

(58) Field of Classification Search
CPC . B23Q 3/06; B23Q 3/082; B23Q 3/00; B23Q 3/18
(Continued)

(56) References Cited

U.S. PATENT DOCUMENTS 6,095,509 A    8/2000 Yonezawa
2006/0049565 A1*  3/2006 Petit ..................... B25B 5/087
269/32
(Continued)

FOREIGN PATENT DOCUMENTS

EP    3078449 A1    10/2016
JP    2001-300831 A    10/2001
(Continued)

OTHER PUBLICATIONS

Office Action dated Sep. 14, 2018, issued in Taiwan application No. 10-4139694.
(Continued)

*Primary Examiner* — Katina N. Henson
(74) *Attorney, Agent, or Firm* — Bacon & Thomas, PLLC (57) ABSTRACT

A clamping apparatus includes: locking members (80) insertable into a hole (11) of a workpiece (10); and a clamp rod (70) configured to make a wedge engagement with the locking members (80) from above. Each locking member (80) includes a base portion (85) configured to be inserted into the hole (11); and a protruding portion (87) located above the base portion (85). A relative movement restriction mechanism (M) configured to restrict downward movement of the clamp rod (70) relative to the locking members (80) within a predetermined travel distance allows descent of outer peripheral surfaces (85a) of the base portions (85) relative to an inner peripheral surface of the hole (11) when the locking members (80) are in a diameter-expanded position.

3 Claims, 5 Drawing Sheets

(58) Field of Classification Search
USPC .................................................. 269/49, 309
See application file for complete search history.

(56) References Cited

U.S. PATENT DOCUMENTS

2008/0230973 A1* 9/2008 Miyazaki ............... B23Q 3/082
 269/309
2011/0133381 A1 6/2011 Kawakami

FOREIGN PATENT DOCUMENTS

| JP | 2001300831 A | 10/2001 |
| JP | 2005040922 A | 2/2005 |
| JP | 2005-40922 A | 8/2006 |
| JP | 2008 229777 A | 10/2008 |
| JP | 2008229777 A | 10/2008 |
| JP | 2010036314 A | 2/2010 |
| WO | 2014/002684 A1 | 1/2014 |

OTHER PUBLICATIONS

Chinese Office Action issued in Chinese Application No. 201580058378. X, dated Dec. 3, 2018.
International Search Report for application No. PCT/JP2015/083009 dated Dec. 11, 2015.
Office Action dated May 29, 2018, issued in Japanese application No. 2014-246833.
Office Action dated Jun. 20, 2018, issued in Chinese application No. 2015 80058378.X.
Extended European Search Report in corresponding European Patent Application No. 15864511.9, dated Mar. 29, 2018.
Chinese Office Action issued in Chinese Application No. 201580058378. X, dated May 28, 2019.

* cited by examiner

CLAMPING APPARATUS

TECHNICAL FIELD

The present invention relates to an apparatus configured to clamp a to-be-clamped object such as a workpiece.

BACKGROUND ART

As described in Patent Literature 1 (Japanese Unexamined Patent Publication No. 2010-36314), a known clamping apparatus is structured as follows (see paragraphs 0051 and 0052 of the Specification).

When the apparatus is driven for clamping, a grip member and a tapered shaft portion of a clamp rod are inserted into a hole of a workpiece functioning as a to-be-clamped object, and then the clamp rod is moved downward. As a result, the clamp rod is moved downward relative to the grip member, in the first place. Consequently, the tapered shaft portion of the clamp rod expands the diameter of a grip claw portion of the grip member, and this causes the grip claw portion to cling to an inner peripheral surface of the hole of the workpiece to establish an engaged state. Subsequently, the grip member and the clamp rod are slightly moved downward together, and thereby the workpiece is firmly pressed onto a seating surface.

CITATION LIST

Patent Literature

Patent Literature 1: Japanese Unexamined Patent Publication No. 2010-036314

SUMMARY OF INVENTION

Technical Problem

In the above known art, it is possible for the grip claw portion to cling to the inner peripheral surface of the hole to establish the engaged state when the peripheral wall of the hole of the workpiece has a large thickness, because the area of the inner peripheral surface of the hole is large. To the contrary, when the peripheral wall of the hole of the workpiece has a small thickness, the area of the inner peripheral surface of the hole is small, and therefore, the engagement between the grip claw portion and the hole can be insufficient. This may cause a difficulty in reliably clamping the workpiece.

An object of the present invention is to provide an apparatus capable of reliably clamping a to-be-clamped object such as a workpiece.

Solution to Problem

In order to achieve the above object, a clamping apparatus of the present invention is structured as follows, for example, as shown in FIG. 1A to FIG. 5B.

A locking member 80 insertable into a hole 11 of a to-be-clamped object 10 protrudes toward a leading end side relative to a housing 30. The locking member 80 is pushed by an advancing means 58 toward the leading end side with a predetermined force. A wedge surface 71 of a clamp rod 70 makes an engagement with the locking member 80 from the leading end side. The clamp rod 70 is configured to be driven toward a base end side for clamping by a driving means 40 and configured to be driven toward the leading end side for unclamping by the driving means 40. The locking member 80 includes: a base portion 85 configured to be inserted into the hole 11; and a protruding portion 87 provided on the leading end side relative to the base portion 85. The protruding portion 87 is configured to come to face a peripheral wall of the hole 11 from the leading end side when the locking member 80 is moved to a radially outside diameter-expanded position. A relative movement restriction mechanism M configured to restrict movement of the clamp rod 70 toward the base end side relative to the locking member 80 within a predetermined travel distance is provided. The relative movement restriction mechanism M allows movement of an outer peripheral surface 85a of the base portion 85 toward the base end side relative to an inner peripheral surface of the hole 11 when the locking member 80 is in the diameter-expanded position.

In the above arrangement, when the locking member 80 is in the diameter-expanded position, the outer peripheral surface 85a of the base portion 85 and the inner peripheral surface of the hole 11 may be in contact with each other, or a predetermined gap may be created between these surfaces (the outer peripheral surface 85a of the base portion 85 and the inner peripheral surface of the hole 11). In other words, it is preferable to arrange the apparatus so that, when the locking member 80 is in the diameter-expanded position, these surfaces do not cling to each other by plastic deformation or these surfaces are not in strong and close contact with each other.

Advantageous Effects of Invention

An apparatus capable of reliably clamping a to-be-clamped object such as a workpiece is provided by structuring the apparatus as described above.

DESCRIPTION OF EMBODIMENTS

FIG. 1A to FIG. 5B show an embodiment of the present invention. A clamping apparatus of this embodiment is used to clamp a workpiece functioning as a to-be-clamped object.

First of all, the overall structure of the workpiece and the clamping apparatus will be described, with reference to FIG. 1A and FIG. 1B.

In this embodiment, a workpiece 10 is a steel sheet to be used as a material for panels for automobiles. The thickness of the steel sheet is approximately 1 mm to 2 mm. The workpiece 10 has a hole 11 passing through the workpiece 10 in its thickness direction.

A clamping apparatus 20 is configured to clamp the workpiece 10 using a peripheral wall of the hole 11 of the workpiece 10. The clamping apparatus 20 includes: a housing 30; a driving means 40; a guide member 50; an advance spring (advancing means) 58; a clamp rod 70; locking members 80; and the like.

Figures 1A, 1B:
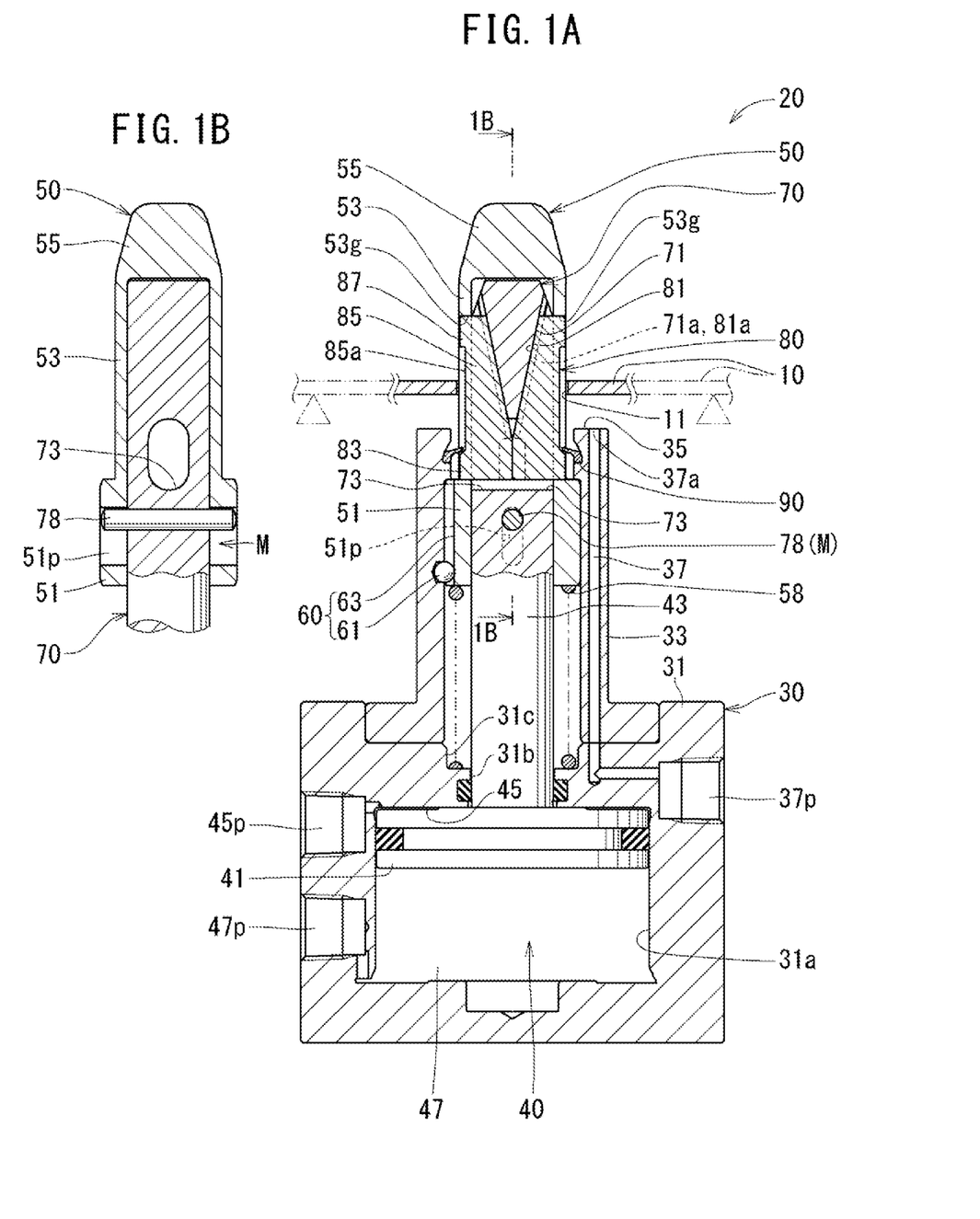
FIG. 1A is an elevational sectional view of a clamping apparatus in an unclamping state.
FIG. 1B is a cross section taken along a line 1B-1B in FIG. 1A.

To be more specific, the clamping apparatus 20 is structured as follows, as shown in FIG. 1A and FIG. 1B.

The housing 30 is mounted on a stationary stand (not illustrated) such as a table. The housing 30 includes: a lower housing 31 fixed to the stationary stand via a plurality of bolts (not illustrated); and a cylindrical upper housing 33 placed on top of the lower housing 31. The lower housing 31 and the upper housing 33 are fastened to each other via a plurality of bolts (not illustrated).

The lower housing 31 has a large-diameter cylinder hole 31a, a small-diameter hole 31b, and a middle-diameter hole 31c, which are arranged from bottom to top.

A piston 41 is hermetically inserted into the cylinder hole 31a, and a piston rod 43 protruding upward from the piston 41 is hermetically inserted into the small-diameter hole 31b. Compressed air is supplied to and discharged from a clamp chamber 45 formed above the piston 41 via a supply and discharge port 45p. Compressed air is also supplied to and discharged from an unclamp chamber 47 formed below the piston 41 via another supply and discharge port 47p.

The piston 41, the piston rod 43, the clamp chamber 45, and the unclamp chamber 47 constitute the driving means 40 for the clamp rod 70.

A seat portion 35 configured to receive the workpiece 10 is provided at an upper end of the upper housing 33. A detection passage 37 extending in a vertical direction is provided in a cylindrical wall of the upper housing 33. An upper portion 37a of the detection passage 37 opens to the seat portion 35, and a lower portion of the detection passage 37 is communicatively connected to a supply port 37p. Pressurized air for detection is able to be supplied to the supply port 37p.

A guide member 50 is inserted into an upper portion of the upper housing 33 so as to be movable in the vertical direction (axial direction). The guide member 50 is formed unitarily and seamlessly, and includes a support cylinder 51, a peripheral wall 53, and a top wall 55 which are arranged in order from bottom to top. The guide member 50 protrudes upward (toward a leading end side) relative to the upper end (leading end) of the upper housing 33, so as to be insertable into the hole 11 of the workpiece 10.

A pair of guide grooves 53g facing each other in a horizontal direction pass through the peripheral wall 53. The locking members 80 are respectively inserted into the guide grooves 53g so as to be movable in a radial direction (horizontal direction). The locking members 80 are configured to be received by the support cylinder 51 from below.

The clamp rod 70 is insertable into the guide member 50 from below (from a base end side). In this embodiment, the clamp rod 70 is formed unitarily with the piston rod 43.

Wedge surfaces 71 provided at an upper portion of the clamp rod 70 come to make an engagement, from above, with inclined surfaces 81 on respective inner surfaces of the locking members 80. Each of the wedge surfaces 71 and inclined surfaces 81 is inclined so that the distance from the axis of the clamp rod 70 decreases downward. Each of these surfaces is formed by a plane in this embodiment.

The inclination angle at which each wedge surface 71 is inclined with respect to the axis of the clamp rod 70 is within a range from approximately 10 degrees to approximately 14 degrees in this embodiment. However, the inclination angle may be set within a desired range depending on the thickness of the workpiece 10 and/or the vertical position to which the workpiece 10 is carried in.

An advancing means pushing the guide member 50 with a predetermined force is provided. The advancing means is formed by an advance spring 58 disposed in an annular space between the housing 30 and the piston rod 43. The advance spring 58 biases the locking members 80 upward via the guide member 50.

Furthermore, the guide member 50 is guided by a straight-movement guide means 60 in the vertical direction. The straight-movement guide means 60 includes: a ball 61 attached to an inner periphery of the upper housing 33; and a straight-movement guide groove 63 provided on an outer periphery of the guide member 50 so as to extend in the vertical direction. The ball 61 is fitted in the straight-movement guide groove 63.

A pin 78 extending in the radial direction (horizontal direction) is attached to a lower portion of the clamp rod 70. Both end portions of the pin 78 are respectively inserted into pin holes 51p provided through a peripheral wall of the support cylinder 51 of the guide member 50. A lower wall (base end wall) of each pin hole 51p restricts downward movement (movement toward the base end side) of the clamp rod 70 relative to the guide member 50 (and the locking members 80) within a predetermined travel distance. That is, the pin 78 and the pin holes 51p constitute a relative movement restriction mechanism M.

Figure 2A:
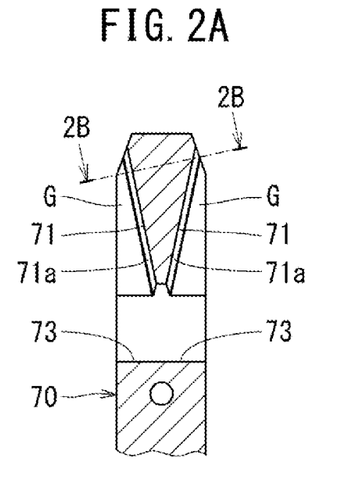
FIG. 2A is an elevational sectional view of a clamp rod of the clamping apparatus.
Figure 2B:
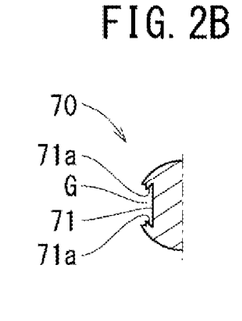
FIG. 2B is a partial cross section taken along a line 2B to 2B in FIG. 2A.

Now, the detailed structure of the clamp rod 70 will be described based on FIG. 2A and FIG. 2B, and with reference to FIG. 1A.

The clamp rod 70 has, at its upper portion, groove portions G extending in the vertical direction. The groove portions G are configured so that the locking members 80 are moved between a radially outside diameter-expanded position and a radially inside diameter-reduced position. A bottom surface of each groove portion G forms the wedge surface 71. On both sides of each wedge surface 71, engagement grooves 71a are provided.

A pair of recesses 73 communicatively connected to each other are provided at a lower outer peripheral portion of the clamp rod 70. Each recess 73 accommodates therein an inner peripheral portion of a lower portion 83 of the corresponding locking member 80.

Now, the detailed structure of each locking member 80 will be described based on FIG. 3A to FIG. 3C and FIG. 4, and with reference to FIG. 1A.

Figure 3A:
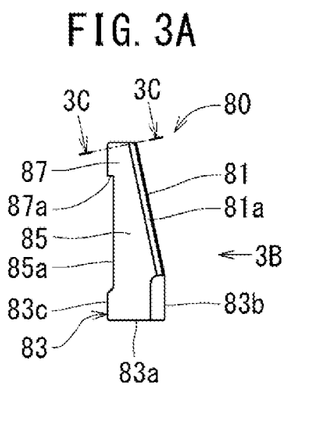
FIG. 3A is an elevational view of a locking member of the clamping apparatus.
Figure 3B:
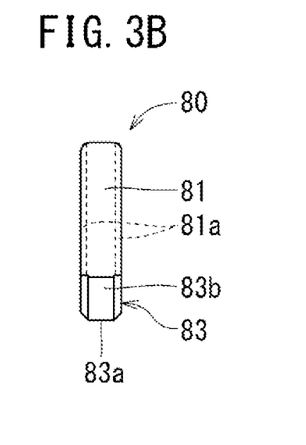
FIG. 3B is a view of the locking member, viewed along an arrow 3B in FIG. 3A.
Figure 3C:
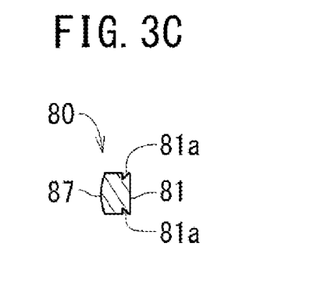
FIG. 3C is a cross section taken along a line 3C-3C in FIG. 3A.
Figure 4:
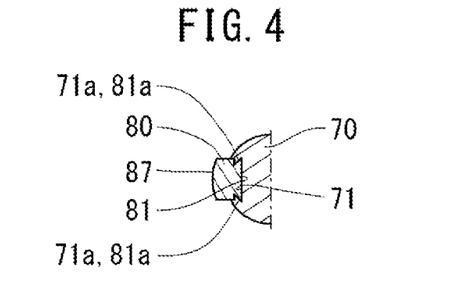
FIG. 4 is a partial cross section showing a combination of the clamp rod shown in FIG. 2B and the locking member shown in FIG. 3C.

Each locking member 80 includes the lower portion 83, a base portion 85, and a protruding portion 87, which are arranged in order from bottom to top. As shown in FIG. 3A, the lower portion 83 includes: an end surface 83a configured to be received by the support cylinder 51 of the guide member 50; an inner peripheral portion 83b; and an outer peripheral portion 83c. The outer peripheral portion 83c of the lower portion 83 and an outer peripheral surface of the protruding portion 87 are located radially outside (to the left in FIG. 3A) relative to an outer peripheral surface 85a of the base portion 85. The inclined surface 81, which is configured to be in contact with the corresponding wedge surface 71 of the clamp rod 70, and engaging portions 81a are provided to extend over an inner peripheral portion of the protruding portion 87 and an inner peripheral portion of the base portion 85. The engaging portions 81a are provided on both sides of the inclined surface 81. The engaging portions 81a are respectively fitted in the engagement grooves 71a of the clamp rod 70.

Further, as shown in FIG. 1A, a dust seal 90 is provided between an upper portion of an inner peripheral surface of the upper housing 33 and the locking members 80. The dust seal 90 is made of synthetic resin, for example. An inner peripheral portion of the dust seal 90 is in contact with a lower portion of the outer peripheral surfaces 85a of the base portions 85. Due to this arrangement, the dust seal 90 biases the locking members 80 radially inward.

Figure 5A:
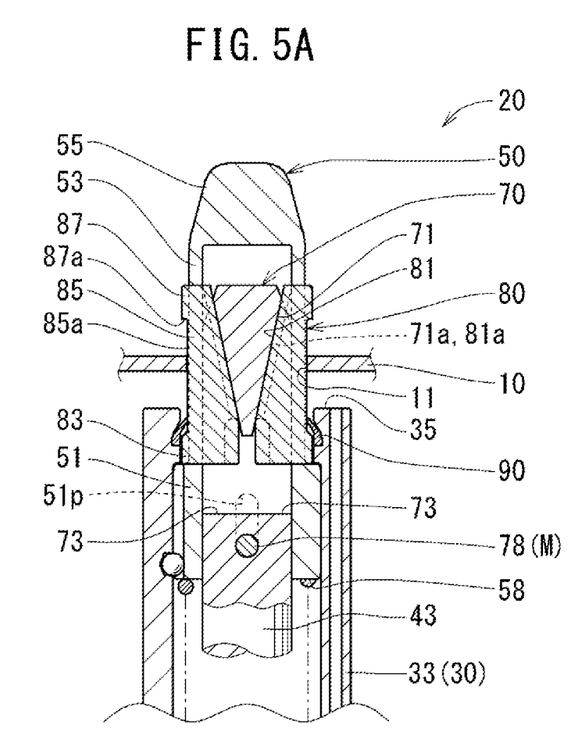
FIG. 5A shows a state of the clamping apparatus in the middle of clamping operation, and is a partial view similar to FIG. 1A.
Figure 5B:
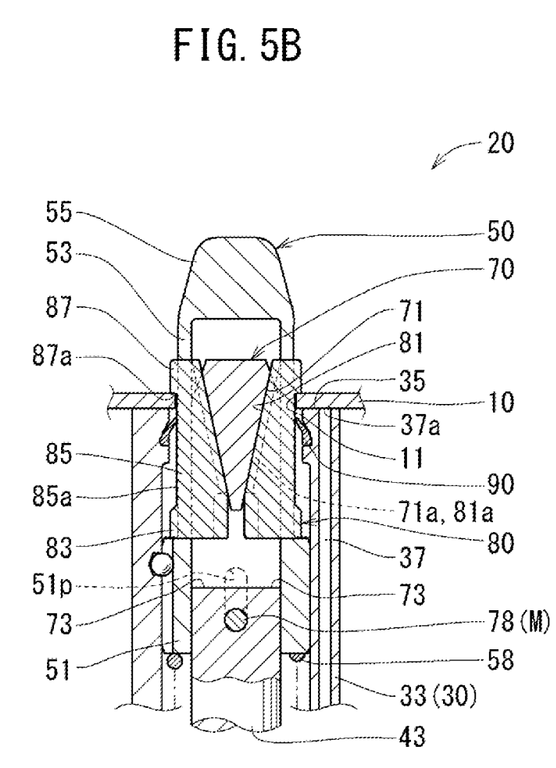
FIG. 5B shows a clamping state of the clamping apparatus, and is a partial view similar to FIG. 1A.

The above-described clamping apparatus 20 operates as follows, as shown in FIG. 1A and FIGS. 5A and 5B.

In an unclamping state shown in FIG. 1A, compressed air in the clamp chamber 45 has been discharged, and compressed air has been supplied to the unclamp chamber 47. As a result, the piston 41 has moved the clamp rod 70 to an upper unclamping position, and the advance spring 58 has moved the guide member 50 and the locking members 80 to their upper unclamping positions. In addition, each locking member 80 has been retracted radially inward greatly in accordance with the fitted structure between the engagement grooves 71a and the engaging portions 81a.

Because of this, the outer peripheral surface of the protruding portion 87 of each locking member 80 is located inward of the outer peripheral surface of the peripheral wall 53 of the guide member 50. Furthermore, the inner peripheral portions 83b (see FIG. 3A) of the lower portions 83 of the pair of locking members 80, 80 are in contact with each other. Due to this arrangement, the guide member 50 prevents collision between the peripheral wall of the hole 11 of the workpiece 10 and the locking members 80 when the workpiece 10 is carried in, as described below.

As the workpiece 10 is lowered in the above unclamping state, the hole 11 of the workpiece 10 is fitted over the peripheral wall 53 of the guide member 50 and the locking members 80 with a predetermined gap, and an under surface of the workpiece 10 is received by seating members (see virtual triangular parts illustrated with two-dot chain lines in FIG. 1A).

To change from the unclamping state shown in FIG. 1A to a clamping state, compressed air in the unclamp chamber 47 is discharged while compressed air is supplied to the clamp chamber 45, to lower the piston 41.

As a result, first of all, the clamp rod 70 descends relative to the guide member 50 and the locking members 80 which are held at their upper positions by the biasing force of the advance spring 58.

Then, as shown in the state in the middle of the clamping operation ("clamp intermediate state") shown in FIG. 5A, the wedge surfaces 71 of the clamp rod 70 push the locking members 80 radially outward, and simultaneously with this, outer end portions of the pin 78 of the clamp rod 70 respectively come into contact with the lower walls of the pin holes 51p of the support cylinder 51 of the guide member 50. This prevents further descent of the clamp rod 70 relative to the guide member 50 and the locking members 80.

In the clamp intermediate state shown in FIG. 5A, the locking members 80 have been moved to the radially outside diameter-expanded position, and the outer peripheral surfaces 85a of the base portions 85 of the locking members 80 are in contact with the inner peripheral surface of the hole 11 of the workpiece 10. Due to this, the workpiece 10 is positioned with respect to the horizontal direction. Furthermore, the protruding portions 87 of the locking members 80 come to face the peripheral wall of the hole 11 from above.

Subsequently, as shown in the clamping state illustrated in FIG. 5B, the guide member 50 and the locking members 80, as well as the clamp rod 70, descend together against the advance spring 58. As a result, under surfaces 87a of the protruding portions 87 of the locking members 80 lower the peripheral wall of the hole 11 of the workpiece 10 and press the workpiece 10 onto the seat portion 35 of the upper housing 33. In this way, the workpiece 10 having a small thickness is firmly and reliably clamped. In this clamping state, a proximal portion of the thin workpiece 10 that is in the proximity of the hole 11 is warped downward relative to a distal portion of the workpiece 10 that is away from the hole 11 in the horizontal direction (see the part illustrated with two-dot chain lines in FIG. 1A), with the result that the peripheral wall of the hole 11 is pulled downward.

When the locking members 80 are in the diameter-expanded position (see FIG. 5A), the inner peripheral surface of the hole 11 of the workpiece 10 and the outer peripheral surfaces 85a of the base portions 85 are merely in contact with each other. These surfaces do not cling to each other or are not in strong and close contact with each other in this state. This allows the locking members 80 to smoothly descend with respect to the hole 11.

Further, in the clamping state shown in FIG. 5B, the upper portion 37a of the detection passage 37 is closed by the under surface of the workpiece 10. Because of this, pressure of pressurized air for detection supplied to the detection passage 37 exceeds a set pressure. Whether the workpiece 10 has been clamped is able to be checked by detecting the pressure rising by a pressure switch or the like.

Unclamping operation of the clamping apparatus 20 is performed through the substantially reversed procedure of the above-described procedure for clamping operation.

The above-described embodiment provides the following advantages.

As described above, the apparatus is configured so that when the locking members 80 are in the diameter-expanded position (see FIG. 5A), the outer peripheral surfaces 85a of the base portions 85 are in contact with the inner peripheral surface of the hole 11 of the workpiece 10. This enables positioning of the workpiece 10 with respect to the horizontal direction.

Furthermore, it is possible to lower the workpiece 10 having been carried in to a freely-selected vertical position, as shown in FIG. 1A.

The locking members 80 are supported by the guide member 50 so as to be movable in the radial direction, and this enables smooth movement of the locking members 80. The relative movement restriction mechanism M is provided between: the support cylinder 51 functioning as a base-end-side portion of the guide member 50; and the clamp rod 70. This enables the relative movement restriction mechanism M to have a simple structure. The relative movement restriction mechanism M is constituted by the pin holes 51p of the support cylinder 51 and the pin 78 of the clamp rod 70. This makes the structure of the mechanism M further simpler.

The above-described embodiment is changeable as follows.

The apparatus may be configured so that, when the locking members 80 are in the diameter-expanded position (see FIG. 5A), a predetermined gap is created between the outer peripheral surfaces 85a of the base portions 85 and the inner peripheral surface of the hole 11 of the workpiece 10.

Operating fluid used for the driving means 40 may be liquid such as pressure oil, instead of compressed air. The driving means 40 may be of a single-acting type such as a spring-releasing type and a spring-locking type, instead of the double-acting type, which has been described by way of example. Further, the driving means 40 may be another type of actuator such as an electric motor, instead of the fluid pressure actuator.

The clamp rod 70 and the piston rod 43 may be structured as separate members, instead of being structured as a unitary member.

The advancing means may be a member using a pressure fluid such as compressed air and pressure oil, instead of the advance spring 58 which has been described by way of example.

The support cylinder 51, the peripheral wall 53, and the top wall 55 of the guide member 50 may be structured as separate members, instead of being formed unitarily and seamlessly.

Alternatively, the guide member 50 may be omitted, and the locking members 80 may be exposed to an outside space. In this alternative, the lower portions of the locking members 80 may be supported by the upper portion of the upper housing 33 so as to be movable in the radial direction.

The engagement grooves 71a of the clamp rod 70 and the engaging portions 81a of the locking members 80 do not have to be provided. In this arrangement, in order to return the two locking members 80 to the radially inside diameter-reduced position, an annular elastic member may be fitted around the locking members 80.

The number of the locking members 80 may be three or more instead of two. Alternatively, instead of plural locking members, a single annular collet having one or more slits may be used as a locking member 80.

The pair of recesses 73, 73 of the clamp rod 70 do not have to be communicatively connected to each other as long as the pair of recesses 73, 73 are provided in the outer peripheral surface of the clamp rod 70.

The relative movement restriction mechanism M may be provided between the upper portion of the clamp rod 70 and upper portions of the locking members 80.

The seat portion 35 configured to receive the workpiece 10 may be provided on a seat block disposed radially outward of the upper housing 33, instead of being provided at the upper portion of the upper housing 33.

A workpiece to be clamped is not limited to the workpiece 10 having the small thickness, which has been described by way of example. There is no problem if a to-be-clamped object has a large thickness.

The clamping apparatus 20 of the present invention may be placed in an orientation other than the up-down orientation described by way of example. For example, the clamping apparatus 20 may be placed upside down, in a horizontal orientation, or in an inclined orientation.

Moreover, it is a matter of course that other changes or alterations can be made on the present invention within the scope of envisagement of one skilled in the art.

REFERENCE SIGNS LIST

10: to-be-clamped object (workpiece); 11: hole; 30: housing; 40: driving means; 50: guide member; 51: base-end-side portion of guide member 50 (support cylinder); 51p: pin hole; 58: advancing means (advance spring); 70: clamp rod; 71: wedge surface; 78: pin; 80: locking member; 85: base portion; 85a: outer peripheral surface; 87: protruding portion; M: relative movement restriction mechanism.

The invention claimed is:
1. A clamping apparatus comprising:
a locking member (80) protruding toward a leading end side relative to a housing (30) and configured to be insertable into a hole (11) of a to-be-clamped object (10);
an advancing means (58) pushing the locking member (80) toward the leading end side with a predetermined force;
a clamp rod (70) including a wedge surface (71) configured to make an engagement with the locking member (80) from the leading end side;
a driving means (40) configured to drive the clamp rod (70) toward a base end side for clamping and configured to drive the clamp rod (70) toward the leading end side for unclamping;
a guide member (50) supporting the locking member (80) so that the locking member (80) is movable radially, the guide member (50) being inserted into the housing (30) to be movable toward the leading end side and the base end side, the guide member (50) protruding toward the leading end side relative to the housing (30) so as to be insertable into the hole (11) of the object (10); and
a relative movement restriction mechanism (M) disposed between a base-end-side portion (51) of the guide member (50) and the clamp rod (70) and configured to restrict movement of the clamp rod (70) toward the base end side relative to the locking member (80) within a predetermined travel distance,
the locking member (80) comprising:
a base portion (85) configured to be inserted into the hole (11); and
a protruding portion (87) provided on the leading end side relative to the base portion (85), and configured to come to face a peripheral wall of the hole (11) when the locking member (80) is moved to a radially outside diameter-expanded position,
the relative movement restriction mechanism (M) comprising:
a pin (78) protruding radially outward from the clamp rod (70), and
a pin hole (51p) into which an outer end portion of the pin (78) is inserted, the pin hole (51p) being provided in a peripheral wall of the base-end-side portion (51) of the guide member (50) so as to extend in an axial direction of the guide member (50);
wherein when the clamp rod (70) is driven in a state in which the pin (78) is movable toward the base end side relative to the pin hole (51p), the advancing means (58) restricts movement of the locking member (80) toward the base end side relative to the housing (30) and the clamp rod (70) moves toward the base end side relative to the guide member (50) and the locking member (80) so that the wedge surface (71) pushes the locking member (80) radially outward, and
when the clamp rod (70) is driven in a state in which the pin (78) is in contact with a wall on the base end side of the pin hole (51p), movement of the clamp rod (70) toward the base end side relative to the guide member (50) and the locking member (80) is restricted, and in a state in which movement of the locking member (80) to a position radially outside the diameter-expanded position is restricted, the locking member (80) moves toward the base end side against advancing means (58) so that movement of an outer peripheral surface (85a)

of the base portion (85) toward the base end side relative to the inner peripheral surface of the hole (11) is allowed.

2. The clamping apparatus according to claim 1, wherein when the locking member (80) is in the diameter-expanded position, the outer peripheral surface (85*a*) of the base portion (85) is in contact with the inner peripheral surface of the hole (11).

3. The clamping apparatus according to claim 1, wherein when the locking member (80) is in the diameter-expanded position, a predetermined gap is created between the outer peripheral surface (85*a*) of the base portion (85) and the inner peripheral surface of the hole (11).

\* \* \* \* \*